(12) United States Patent
Koguchi (10) Patent No.: US 7,548,993 B2
(45) Date of Patent: Jun. 16, 2009

(54) DATA TRANSMISSION APPARATUS, DATA TRANSMISSION METHOD AND DATA TRANSMISSION PROGRAM

(75) Inventor: Masatsugu Koguchi, Matsudo (JP)

(73) Assignee: Minolta Co., Ltd., Osaka (JP)

( * ) Notice: Subject to any disclaimer, the term of this patent is extended or adjusted under 35 U.S.C. 154(b) by 568 days.

(21) Appl. No.: 10/098,562

(22) Filed: Mar. 18, 2002

(65) Prior Publication Data

US 2002/0141380 A1    Oct. 3, 2002

(30) Foreign Application Priority Data

Mar. 28, 2001    (JP)    ............................. 2001-093199

(51) Int. Cl.
*G06F 15/16*    (2006.01)
*H04M 11/00*    (2006.01)
(52) U.S. Cl. .................. 709/250; 709/249; 379/100.12; 379/100.13
(58) Field of Classification Search ................ 709/245, 709/246, 206; 379/93.15, 100.13, 100.12
See application file for complete search history.

(56) References Cited

U.S. PATENT DOCUMENTS

| | | | | |
|---|---|---|---|---|
| 5,943,398 A | * | 8/1999 | Klein et al. ............... | 379/88.13 |
| 6,335,966 B1 | * | 1/2002 | Toyoda ................... | 379/100.06 |
| 6,421,429 B1 | * | 7/2002 | Merritt et al. ............. | 379/93.17 |
| 6,647,384 B2 | * | 11/2003 | Gilmour ........................ | 707/5 |
| 6,654,601 B2 | * | 11/2003 | Picoult et al. ............. | 455/412.1 |
| 7,103,633 B1 | * | 9/2006 | Malik .......................... | 709/206 |
| 2002/0062363 A1 | * | 5/2002 | Naylor et al. ............... | 709/223 |
| 2003/0088704 A1 | * | 5/2003 | Mertama et al. ............ | 709/246 |

FOREIGN PATENT DOCUMENTS

| | | | |
|---|---|---|---|
| EP | 912036 A2 | * | 4/1999 |
| EP | 1022894 A2 | * | 7/2000 |
| JP | 09-233243 | | 9/1997 |
| JP | 10-233860 | | 9/1998 |
| JP | 2000-236413 | | 8/2000 |

* cited by examiner

*Primary Examiner*—Ashok B Patel
(74) *Attorney, Agent, or Firm*—Morrison & Foerster LLP (57) ABSTRACT

A data transmission apparatus capable of transmitting image data to a recipient using recipient's desired transmission parameters regardless of whether the recipient resides inside or outside an intranet to which the apparatus is connected, wherein the recipient is requested via an e-mail to designate the desired transmission parameters through the most appropriate transmission medium that is set in consideration of the recipient's location. Specifically, the transmission medium is set to a Web browser if the recipient resides inside the intranet to which the apparatus is connected, while it is set to an e-mail if the recipient resides outside the intranet.

12 Claims, 7 Drawing Sheets

Image data is sent according to the following parameters by getting this e-mail back.
71 — If parameters are changed, image data is sent according to the changed parameters.
Please get this mail back no later than ***.

SENDING PARAMETERS
Resolution: 100
 changeable parameters: 100/200/400/600
Color: color
72 —  changeable parameters: color/monochrome
File format: PDF
 changeable parameters: PDF/TIFF/JPEG
***: 
 changeable parameters: */*/***

RECIPIENT CHANGE
E-mail:
InternetFAX:
FAX:

Fig. 9

DATA TRANSMISSION APPARATUS, DATA TRANSMISSION METHOD AND DATA TRANSMISSION PROGRAM

This application is based on Japanese Patent Application No. 2001-93199 filed in Japan on Mar. 28, 2001, the entire content of which is hereby incorporated by reference.

BACKGROUND OF THE INVENTION

1. Field of the Invention

This invention relates to a data transmission apparatus, method and program for the transmission of image data over a network, and to a computer-readable recording medium on which such program is recorded.

2. Description of the Related Art

The conventional methods of information transmission using paper, i.e., relay viewing, distribution and posting, are being replaced by methods based on electronic data. For example, a scanner that sends to each user as an attached file to an e-mail over a network image data obtained through the reading of a paper original document is known.

However, in such a scanner having the network function described above, the transmission parameters such as the resolution, the color or monochrome mode, and the file format regarding the image data to be sent, are normally specified by the sender of the image data when such data is sent. Therefore, there have been situations in which the recipient of the image data cannot receive the image data subject to the transmission parameters that the recipient desires.

In order to resolve this problem, the Japanese Laid-Open Patent Application H10-233860, for example, discloses an apparatus that obtains and stores multiple image data sets each having a different image quality, e.g., those used for display and confirmation and those used for printing, in a Web server, wherein such apparatus also provides a notification that image data has been stored by including an URL (Uniform Resource Locator) that indicates the location of the image data in an e-mail. Therefore, based on the URL that indicates the location of the image data, each user can download image data of a desired image quality using a Web browser on the user's client personal computer, enabling the image data to be displayed or stored on the personal computer.

However, in the technology described above, due to security considerations, the Web server on which the image data is stored is not normally accessible outside the intranet to which the Web server is connected. Consequently, the problem arises that a user using a device outside that intranet, i.e., a user who is not an employee of the company, or a user who is an employee but is on a business trip or is stationed overseas, for example, cannot view or obtain the image data stored on the Web server.

OBJECT AND SUMMARY

An object of the present invention is to provide an improved data transmission apparatus, etc., that resolves the various problems identified above.

Another object of the present invention is to provide a data transmission apparatus, etc., that enables image data to be received using the recipient's desired transmission parameters regardless of whether the recipient resides inside or outside the intranet to which the apparatus sending the image data is connected.

These various objects are attained by providing a data transmission apparatus that transmits image data over a network, the data transmission apparatus comprising:

an image reader that obtains image data by reading an original document;

a storage device in which the obtained image data is stored;

request means that requests that the recipient to which the image data stored in the storage device is to be sent designate the contents of the conversion processes to be performed to the image data;

first receiving means that receives the recipient's designation of the contents of the conversion processes;

second receiving means that receives the recipient's designation of the contents of the conversion processes via a transmission medium different from that used by the first receiving means;

switching means that switches the receiving means that receives the designation of the contents of the conversion processes to the first or second receiving means depending on the recipient;

conversion means that, based on the designated contents of the conversion processes, performs the conversion processes to the image data stored in the storage device; and transmission means that sends to the recipient the image data that has undergone the conversion processes.

In the data transmission apparatus described above, it is preferred that the request means have mail transmission means that sends e-mail requesting designation of the contents of the conversion processes.

In this case, it is preferred that the first receiving means receive from the recipient the designation of the contents of the conversion processes based on an instruction sent via a setting screen that is used to designate the contents of the conversion processes and that was referred to by the recipient based on the information that was attached to the e-mail and indicates the location of the data for the setting screen, and that the second receiving means receive from the recipient the designation of the contents of the conversion processes via an e-mail returned in response to the above e-mail. Further, it is preferred that the switching means switches the receiving means that receives the designation of the contents of the conversion processes to the first receiving means when the domain name in the e-mail address of the recipient is identical to the domain name in the e-mail address of the sender, and to the second receiving means when the domain name in the e-mail address of the recipient is different from the domain name in the e-mail address of the sender.

The prescribed conversion processes above include at least a resolution conversion process, a color conversion process or a file format conversion process.

It is also acceptable if the above data transmission apparatus further has recipient change receiving means that receives an instruction to change the recipient, and the transmission means sends the image data that has undergone the conversion processes to the new recipient when the recipient is changed.

The above various objects are also attained by providing a data transmission method for the transmission of image data over a network, the data transmission method comprising:

a) a step of obtaining image data by reading an original document;

b) a step of storing the obtained image data in prescribed storage device;

c) a step of requesting that the recipient to which the image data stored in the storage device is to be sent designate the contents of the prescribed conversion processes to be performed to the image data;

d) a step of receiving the designation of the contents of the conversion processes via one of multiple different transmission media specified depending on the recipient;

e) a step of performing the conversion processes to the image data stored in the storage device based on the designated contents of the conversion processes; and f) a step of sending to the recipient the image data that has undergone the conversion processes.

The above various objects are also obtained by providing a data transmission program that causes a computer to execute a process comprising:

a) a step of requesting that the recipient to which image data is to be sent designate the contents of the conversion processes to be performed to the image data;

b) a step of receiving the recipient's designation of the contents of the conversion processes via a first transmission medium;

c) a step of receiving the recipient's designation of the contents of the conversion processes via a second transmission medium that is different from the first transmission medium;

d) a step of switching the receipt of the designation of the contents of the conversion processes to the first transmission medium or to the second transmission medium depending on the recipient;

e) a step of performing the conversion processes to the image data to be sent based on the designated contents of the conversion processes; and f) a step of sending the image data that has undergone the conversion processes to the recipient.

In step (a), the request for designation of the contents of the conversion processes may be made through the transmission of an e-mail. In this case, the designation of the contents of the conversion processes may be received from the recipient via an instruction sent using a setting screen that is used to designate the contents of the conversion processes and that was referred to by the recipient based on the information that was attached to the e-mail and indicates the location of the data for the setting screen in step (b), and the designation of the contents of the conversion processes may be received from the recipient via an e-mail returned in response to the above e-mail in step (c). Furthermore, in step (d), where the domain name in the e-mail address of the recipient is identical to the domain name in the e-mail address of the sender, the designation of the contents of the conversion processes may be received via the first transmission medium, and where the domain name in the e-mail address of the recipient is different from the domain name in the e-mail address of the sender, switching may be performed such that the designation may be received via the second transmission medium.

Moreover, the above process may include a step of receiving an instruction to change the recipient, and where the recipient is changed, the image data that has undergone the conversion processes is sent to the new recipient in step (f).

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

An embodiment of the present invention is described below with reference to the drawings.

Figure 1:
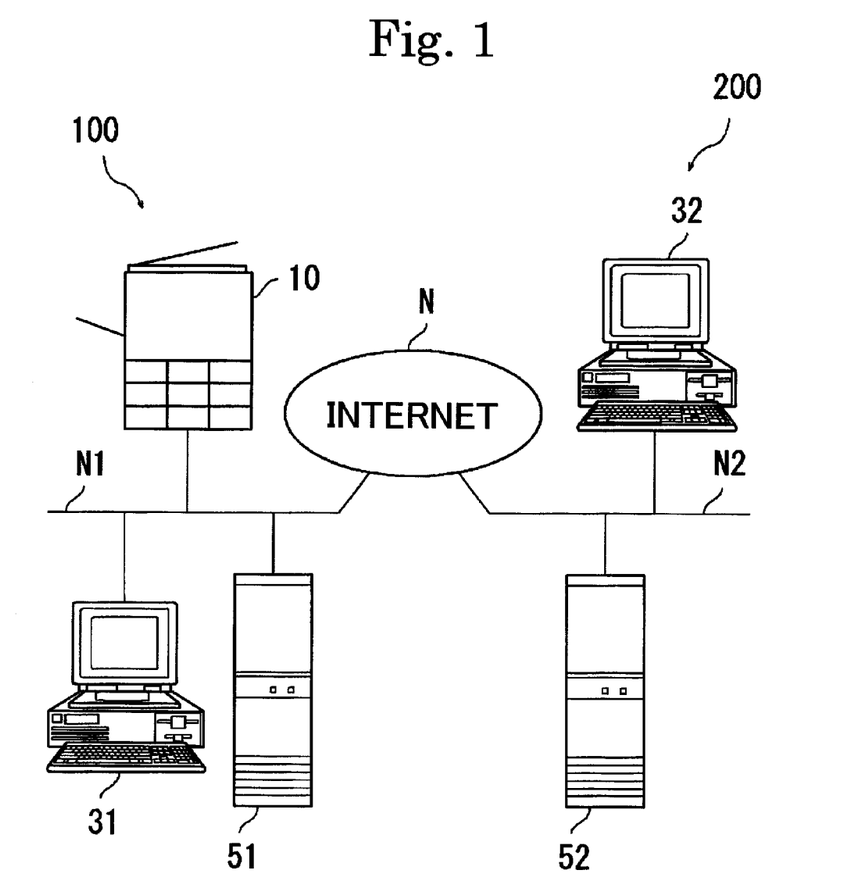
FIG. 1 is a drawing showing the construction of a data transmission system including a data transmission apparatus pertaining to one embodiment of the present invention.

FIG. 1 is a drawing showing the construction of a data transmission system including a data transmission apparatus pertaining to one embodiment of the present invention.

The data transmission system shown in FIG. 1 has a data transmission apparatus 10, personal computers (PCs) 31 and 32 and mail servers 51 and 52.

The data transmission apparatus 10, PC 31 and mail server 51 are connected to a first network N1, while the PC 32 and mail server 52 are connected to a second network N2. The first network N1 and the second network N2 are connected to the Internet N.

The networks N1 and N2 each comprise, for example, a LAN such as an Ethernet®, token-ring type LAN, and an FDDI (Fiber Distributed Data Interface). In FIG. 1, the networks N1 and N2 are illustrated to represent an internal network built in the intranets 100 and 200, respectively. In other words, the intranets 100 and 200 each comprise a LAN or a WAN in which LANs are mutually connected.

The type and number of the devices connected to the network N1 or N2 are not limited in actuality to the type and number shown in FIG. 1.

The construction of each device mentioned above will be described below.

Figure 2:
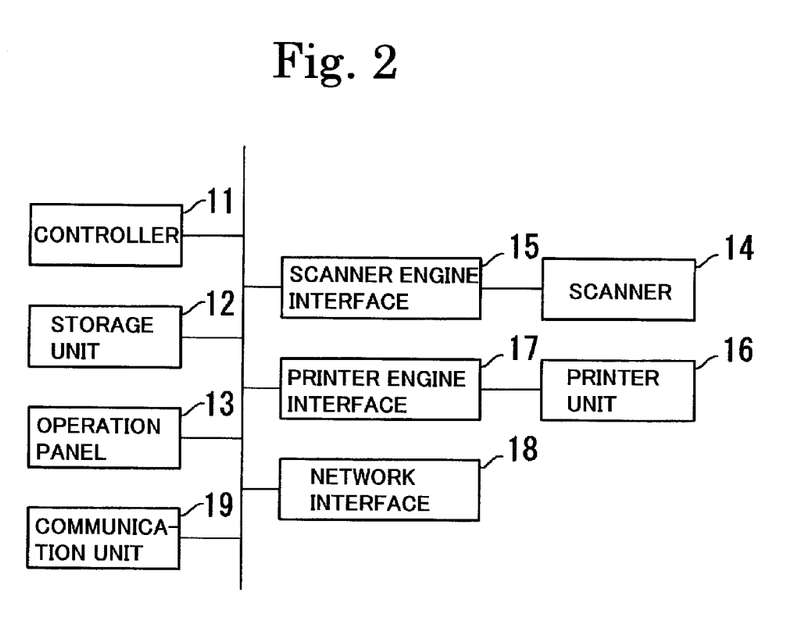
FIG. 2 is a block diagram showing one example of the construction of the data transmission apparatus.

FIG. 2 is a block diagram showing one example of the construction of the data transmission apparatus.

In FIG. 2, the data transmission apparatus 10 has a controller 11, a storage unit 12, an operation panel unit 13, a scanner unit 14, a scanner engine interface 15, a printer unit 16, a printer engine interface 17, a network interface 18 and a communication unit 19.

The controller 11 carries out processing such as execution of programs, arithmetic processing and control of the various components. The storage unit 12 stores various data such as programs and image data, and also temporarily stores data as a working area for the execution of various types of processing. This storage unit 12 comprises a memory and a hard disk, for example.

The operation panel unit 13 comprises, for example, an operation unit by which the user carries out various operations and inputs instructions, as well as a display unit on which various types of display are performed.

The scanner unit 14 obtains image data by reading an original document. The image data output by the scanner unit 14 is first written in the memory, and normally, after scanning of one page is completed, the image data is forwarded from the memory to the hard disk for storage. The scanner engine interface 15 is an interface to connect the scanner unit 14 to the apparatus main unit.

The printer unit 16 prints data in accordance with the prescribed parameters. The printer engine interface 17 is an interface to connect the printer unit 16 to the apparatus main unit.

The network interface 18 is an interface to connect the data transmission apparatus 10 to a network so that the data transmission apparatus 10 can communicate with other devices over the network. The communication unit 19 transmits and receives various data to and from other devices over a network.

The data transmission apparatus 10 has the functions of transmitting and receiving e-mail, as well as Web server functions. The functions of transmitting and receiving e-mail comprise the function of creating e-mail as well as the functions of transmitting and receiving e-mail to and from a mail server. The Web server functions comprise functions to store files using the HTML (Hypertext Markup Language) format, for example, as a database, and to send an HTML file in response to a request from a client on the intranet 100 that includes the network N1. The data transmission apparatus 10 also has, as other image data transmission functions, a function to send image data in accordance with such standards as FTP (File Transfer Protocol), FAX, Internet FAX, and IPP (Internet Printing Protocol).

Figure 3:
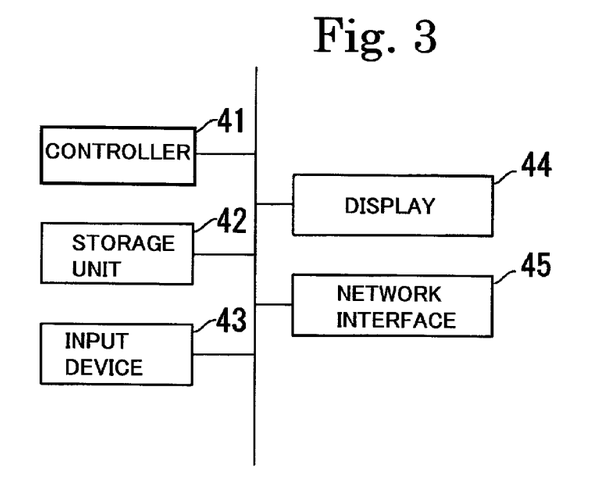
FIG. 3 is a block diagram showing one example of the construction of a personal computer.

FIG. 3 is a block diagram showing one example of the construction of a personal computer (PC).

In FIG. 3, the PC 31 has a controller 41, a storage unit 42, an input device 43, a display 44 and a network interface 45. The PC 32 has a construction identical to that of the PC 31.

The controller 41 carries out processing such as execution of programs, arithmetic processing and control of the various components. The storage unit 42 stores various data such as programs and image data, and also temporarily stores data as a working area for the execution of various types of processing. This storage unit 42 comprises a memory and a hard disk, for example.

The input device 43 is a device for the user to perform various operations and input instructions, and specifically comprises a keyboard and a mouse, for example. The display 44 performs various types of display. The network interface 45 is an interface to connect the PC 31 to a network to enable the PC 31 to communicate with other devices over the network.

The mail servers 51 and 52 each have a controller, a storage unit and a network interface, which are not shown, and the functions of each of these components are roughly the same as those of the corresponding component of the PC 31. However, the mail server 51 and 52 can further include an input device and a display. Here, the storage unit has mailboxes assigned to each mail account for the storage of e-mail. These mail servers 51 and 52 manage the transmission and receipt of e-mail in the data transmission system shown in FIG. 1. For example, they receive an e-mail and store it in the mailbox assigned to the recipient of the e-mail in the storage unit thereof.

Figure 5:
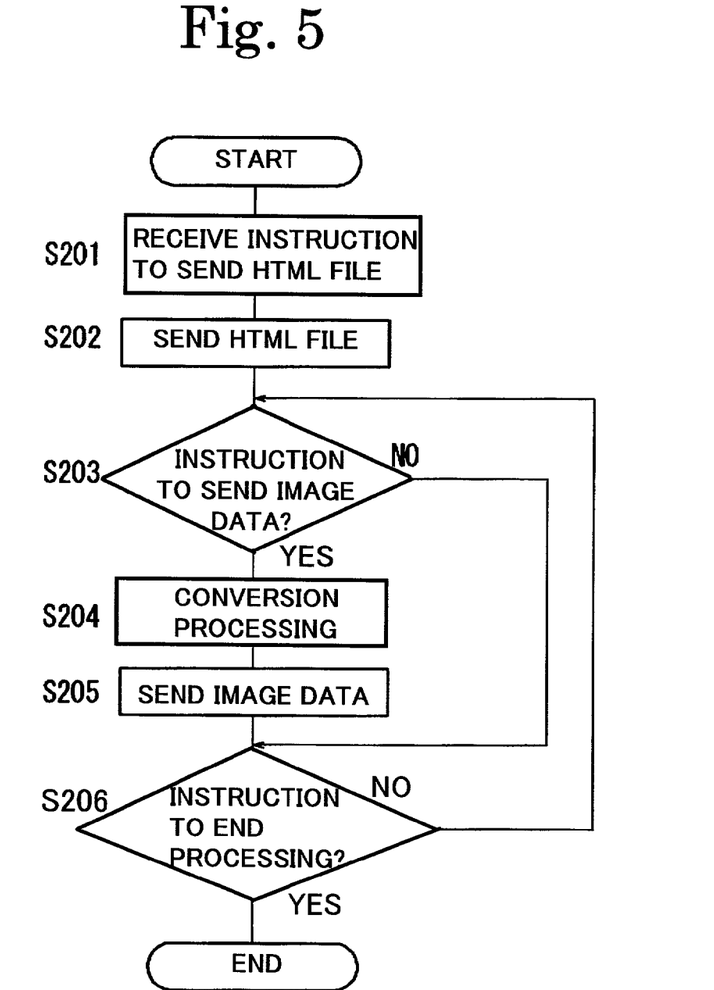
FIG. 5 is a flow chart showing the sequence of the data transmission routine carried out by the data transmission apparatus, by which image data is sent to a recipient residing in the intranet to which the data transmission apparatus also belongs.
Figure 6:
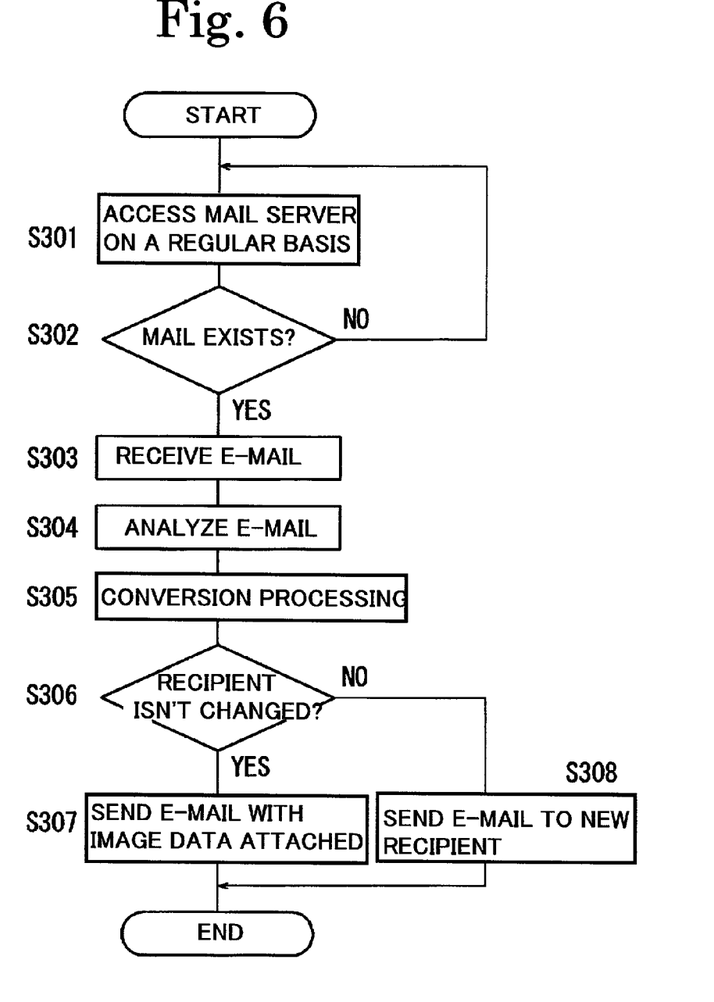
FIG. 6 is a flow chart showing the sequence of the data transmission routine carried out by the data transmission apparatus, by which image data is sent to a recipient residing outside the intranet to which the data transmission apparatus is connected.

The sequence of the data transmission routine carried out by the data transmission apparatus 10 will now be explained with reference to FIGS. 4 through 6. The algorithm shown in the flow charts of FIGS. 4 through 6 is stored in the storage unit 12 of the data transmission apparatus 10 as a control program, and is executed by the controller 11.

Figure 4:
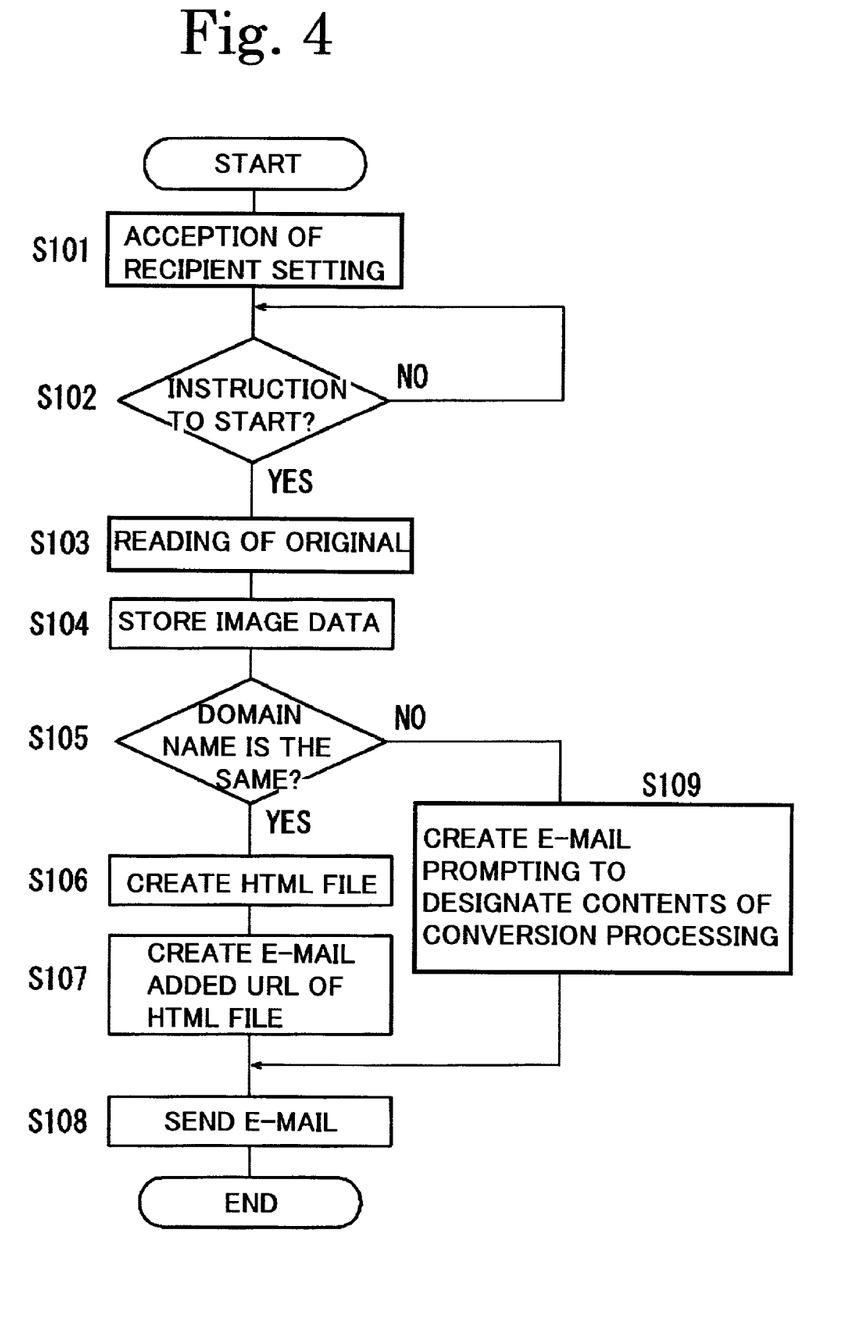
FIG. 4 is a flow chart showing the sequence of the data transmission routine carried out by the data transmission apparatus up to the point that an e-mail providing notification that image data has been stored is sent.

FIG. 4 shows the sequence followed up to the point that an e-mail that provides notification of the storage of image data is sent.

First, in step S101, setting of the recipient to receive the image data is accepted. Here, the user specifies the recipient to receive the image data via the operation panel unit 13.

Furthermore, the user can also enter information into such fields as those for the recipient of the e-mail, the comments to be written in the e-mail, the file name under which the image data is to be stored, the storage period for the file and the security level.

In step S102, the controller 11 waits for the issuance of an instruction by the user via the operation panel unit 13 to begin scanning of the original document, and when the instruction to begin scanning is received, advances to step S103. The instruction to begin scanning is provided by the user operating the start key on the operation panel unit 13, for example.

In step S103, reading of the original document is performed. Here, the original document placed at a prescribed position is read by the scanner unit 14, whereupon image data is obtained. For the reading of the original document, the user can normally designate the scan resolution and specify color or monochrome mode, but when the data transmission routine of this embodiment is to be executed, it is preferred that a prescribed high resolution and color mode be set automatically.

In step S104, the image data obtained in step S103 is stored in the storage unit 12 without undergoing any image processing such as resolution conversion or color conversion.

In step S105, it is determined whether or not the domain name in the e-mail address of the image data recipient is the same as the domain name in the e-mail address of the data transmission apparatus 10.

An e-mail address normally has the format of user name@ [subdomain name]domain name. In other words, an e-mail address comprises a user name that is indicated before the @ mark and a domain name that is indicated after the @ mark. The domain name indicates the country as well as an organization that comprises a government agency or a business, and the user name indicates the name that identifies the user that belongs to such organization. Therefore, by comparing the domain name that is indicated after the @ mark in the e-mail address of the data transmission apparatus 10, which is the sender, and that of the recipient, it can be determined whether or not the recipient resides in the same intranet 100 as the data transmission apparatus 10.

Namely, the data transmission apparatus 10 and the PCs 31 and 32 each have an e-mail address internally set therein. For example, the e-mail address of the data transmission apparatus 10 is scanner@aaa.co.jp, while the e-mail addresses of the PCs 31 and 32's are, respectively, pc1@aaa.co.jp and pc2@bbb.co.jp. Therefore, where image data is sent from the data transmission apparatus 10 to the PC 31, for example, because the domain names in the e-mail addresses of the data transmission 10 and the PC 31 are identical, it is determined that the recipient resides in the intranet 100 to which the data transmission apparatus 10 belongs. On the other hand, where image data is sent from the data transmission apparatus 10 to the PC 32, for example, because the domain names in the e-mail addresses of the data transmission apparatus 10 and the PC 32 are different, it is determined that the recipient resides outside the intranet 100. It is also acceptable to compare the IP addresses of the sender and the recipient instead of comparing the domain names in the e-mail addresses of the parties.

Where the domain names in the e-mail addresses of the image data recipient and the data transmission apparatus 10 are the same (YES in step S105), the processing of step S106 is executed, and where the domain names are different (NO in step S105), the processing of step S109 is executed.

In step S106, an HTML file is created that can cause a setting screen by which to obtain the stored image data using a Web browser to be displayed on the display of the recipient, i.e., the PC 31, for example. This HTML file is stored in the storage unit 12. As described below, the above setting screen is used to designate the contents of the conversion processes to be performed to the image data.

Figure 7:
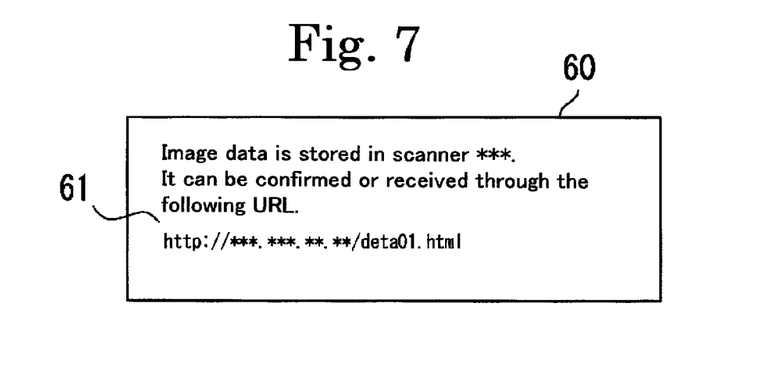
FIG. 7 is a drawing showing one example of an e-mail sent to a recipient residing inside the intranet to which the data transmission apparatus also belongs.

In step S107, as shown in FIG. 7, for example, an e-mail 60 is created to which is added the data to display the above setting screen, i.e., a URL 61 comprising information indicating the location of the HTML file.

Figure 8:
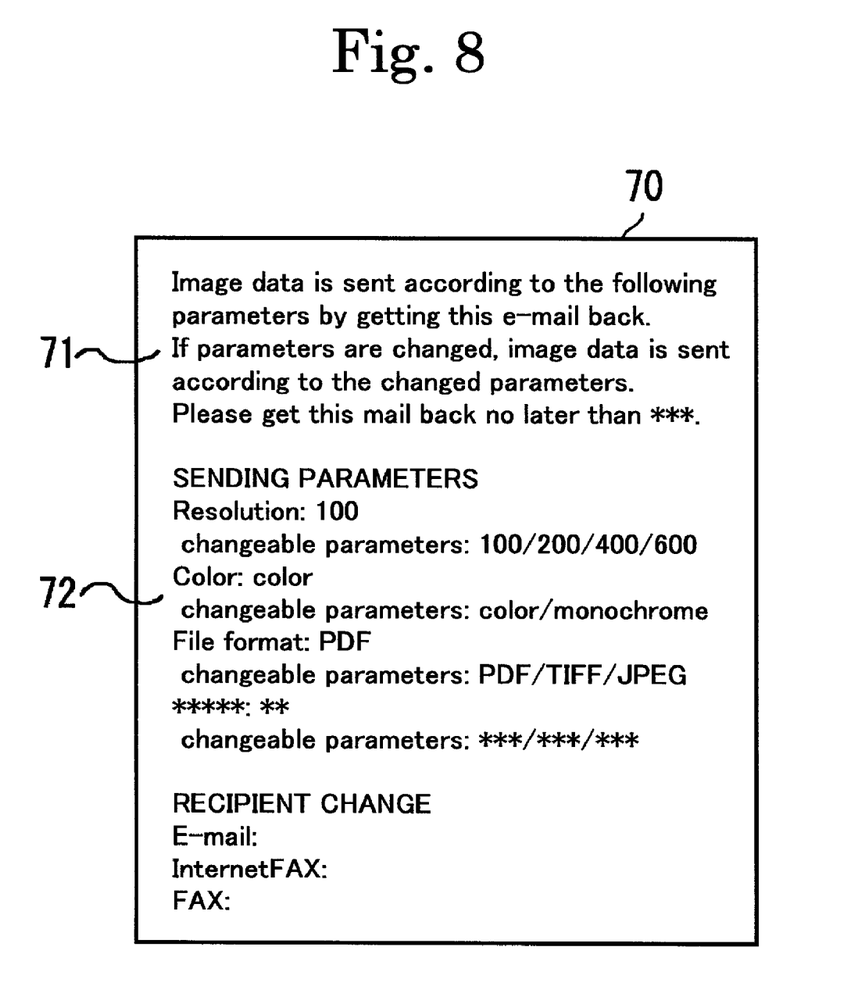
FIG. 8 is a drawing showing one example of an e-mail sent to a recipient residing outside the intranet to which the data transmission apparatus is connected.

On the other hand, in step S109, an e-mail 70 is created that includes a description that prompts the user to designate the contents of the prescribed conversion processes to be performed to the image data, as shown in FIG. 8. Specifically, the contents of the conversion processes are designated by setting the resolution, specifying a color or monochrome mode, and setting the file format to be used for the image data to be sent. The types of conversion processes to be performed to the image data may be changed as appropriate or other processes may be added thereto.

The main text of the e-mail 70 includes a conversion process contents designation field 71 in which to designate the contents of the conversion processes to be performed to the image data and a recipient change field 72 in which to change the image data recipient. A low-resolution image data file may be created to enable rough confirmation of the contents of the image data and attached to the e-mail.

The conversion process contents designation field 71 contains, for example, the types of executable conversion processes, a parameter default value indicating the content of each conversion process, and specific values or items that can replace the default value. However, the above selectable parameter values or items may be changed as appropriate. In FIG. 8, as the executable conversion processes, resolution conversion, color conversion and file format conversion are adopted as described above, for example.

The recipient change field 72 describes the available transmission methods for the image data. Shown in FIG. 8 as the image data transmission methods are the method in which the image data is sent as attached to an e-mail, the method that uses Internet FAX, and the method that uses an ordinary FAX, for example. In other words, where the user wishes to receive the image data using a device other than the device that received the e-mail 70 (i.e., the recipient set in step S101), the user can select a receiving method that can be used by the device on which the user desires to receive the image data and input the recipient information for that device.

In step S108, the created e-mail is sent to the recipient set in step S101 via a mail server. Instead of creating two types of e-mails 60 and 70 depending on the recipient, an e-mail that includes the contents of both e-mails 60 and 70 may be created.

Based on whether or not the recipient resides in the intranet 100 to which the data transmission apparatus 10 belongs, i.e., whether the domain name in the recipient e-mail address is the same as that of the sender, the next step to be executed is switched to either the routine shown in FIG. 5 or that shown in FIG. 6 and described below.

FIG. 5 shows the sequence by which image data is sent to a recipient that resides inside the intranet 100 to which the data transmission apparatus 10 belongs.

With reference to FIG. 5, a situation in which the recipient of the image data set in step S101 in FIG. 4 is the PC 31 will be described below.

In step S201, the controller 11 receives from the PC 31 that received the e-mail 60 an instruction to send the HTML file designated by the URL 61.

The instruction to send the HTML file is issued when the user accesses the URL 61 described in the e-mail 60 using a Web browser on the PC 31. It is also acceptable if a link button that includes the information that indicates the HTML file stored in the storage unit 12 is set in the e-mail 60. In this case, the instruction to send the HTML file is given simply by clicking on the link button, for example.

In step S202, the HTML file designated by the URL 61 is sent to the PC 31.

Figure 9:
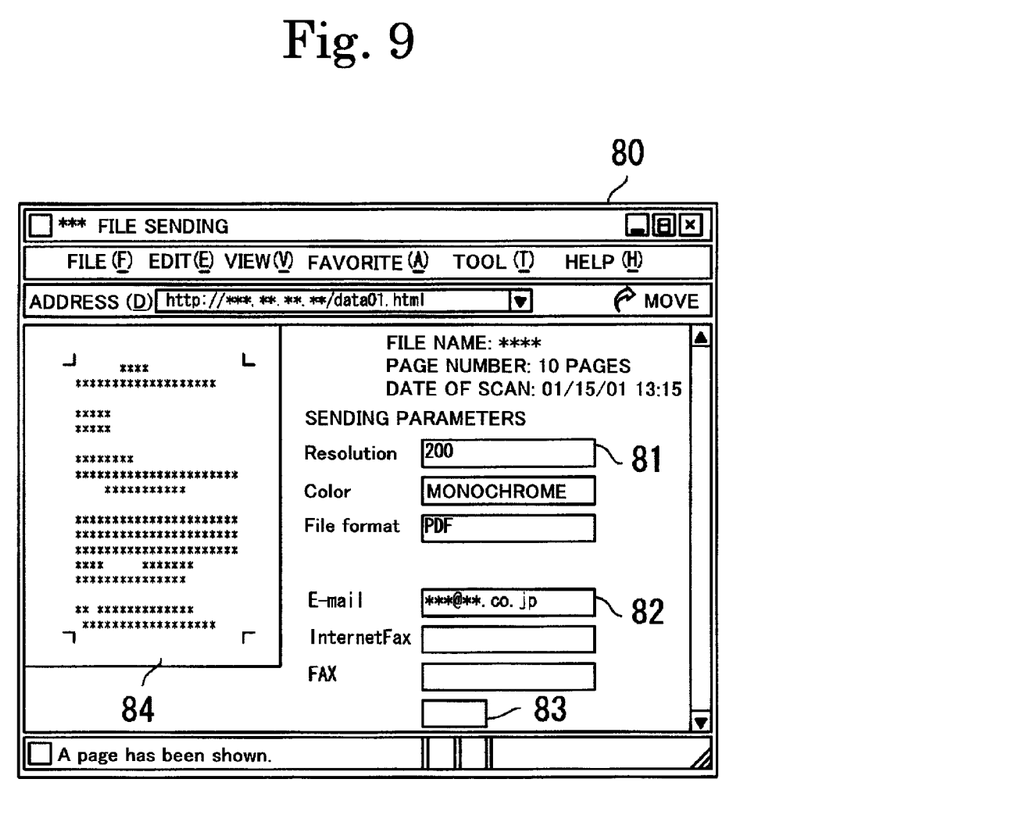
FIG. 9 is a drawing showing one example of the setting screen shown on the display of the personal computer.

When this occurs, the HTML file received by the PC 31 is displayed on the display 44 thereof by the Web browser, as shown in FIG. 9. In other words, a setting screen 80 used to obtain the stored image data is displayed on the display 44.

The user can specify the various parameters on the setting screen 80 thus displayed by the Web browser by using the form function of the HTML file. The 'form function' is the function in which the information input by the user using the Web browser may be returned to the Web server. That is, when an HTML file in which a form function is described is sent from the data transmission apparatus 10 having Web server functions, the setting screen 80 that includes input boxes and designation buttons is displayed on the display 31 by the Web browser in accordance with the description in the HTML file. Therefore, the user can input necessary information using the setting screen 80 and send the input information to the data transmission apparatus 10 having Web server functions. Where the construction in which the various information is input using a Web browser is adopted in this way, only a Web browser that is generally used by a wide range of users is needed. As a result, only a simple construction is needed, and moreover, a further benefit is obtained in that the user can easily and reliably designate the contents of the conversion processes, etc.

Specifically, for example, the setting screen 80 includes input boxes 81 in which to designate the contents of the conversion processes to be performed to the image data, input boxes 82 in which to change the recipient of the image data, and a transmission instruction button 83 by which to instruct transmission of the image data.

One or more input boxes 81 are shown for each conversion process. In FIG. 9, resolution, color and file format conversion processes, for example, are made available as the executable conversion processes. The user can input a specific parameter value or item in each input box 81 to indicate the content of each conversion process. In the example, one value is selected from among 100, 200, 400 and 600 (dpi), for example, and input in the input box 81 for the resolution conversion, either color or monochrome mode, for example, is selected and input in the input box 81 for the color conversion, and one item is selected from among PDF (Portable Document Format), TIFF (Tagged Image File Format) and JPEG (Joint Photographic Experts Group), for example, and input in the input box 81 for file format conversion. The selectable parameter values or items that indicate the possible contents of each conversion process may be changed where necessary.

One or more input boxes 82 are shown for each type of image data transmission method. In FIG. 9, the method in which the image data is sent attached to an e-mail, the method using Internet FAX and the method using regular FAX are adopted as the image data transmission methods, for example. Where the recipient of the image data is to be changed, the user can select an image data transmission method by which the new recipient can receive the image data, and input the identification code of the new recipient in the corresponding input box 82. Where the method to send the image data attached to an e-mail or via Internet FAX is selected, the e-mail address of the recipient is input in the input box 82, while where the method to use regular FAX is selected, the facsimile number of the recipient is input in the input box 82. Because the recipient of the image data that was set in step S101 in FIG. 4 is set in the input box 82 for E-mail in FIG. 9, if the recipient is not to be changed, no input into any of the input boxes 82 is required.

The setting screen 80 also includes such information as the file name and the number of pages of image data, as well as the date and time at which the original document was read. Furthermore, the setting screen 80 preferably includes a reduced image (thumbnail) 84 of the image data. A reduced image is an image that is smaller than the original image data both in display size when displayed as an output image and in data size. The user can roughly understand the contents of the original image data via the reduced image.

In step S203, it is determined whether or not an operation such as clicking has been carried out regarding the transmission instruction button 83 in the setting screen 80 that instructs the transmission of the image data. Where the transmission instruction button 83 has been operated (YES in step S203), the processing of step S204 is performed, while where the transmission instruction button 83 has not been operated (NO in step S203), the processing of step S206 is performed.

In step S204, the contents of the conversion processes designated via the input boxes 81 in the setting screen 80 are received, and based on the designated contents of the conversion processes, conversion of the resolution, color and file format is performed to the image data as needed.

In step S205, the image data that has undergone conversion is sent to the designated recipient in accordance with the specified transmission protocol.

In step S206, it is determined whether or not an instruction to end the processing using the Web browser has been received from the PC 31. Where the instruction to end the processing has been received (YES in step S206), the execution of the image data transmission program is ended. Where the instruction to end the processing has not been received (NO in step S206), the controller 11 returns to the processing of step S203.

FIG. 6 shows the sequence of the routine using which image data is sent to a recipient residing outside the intranet 100 to which the data transmission apparatus 10 is connected.

A situation in which the recipient of the image data set in step S101 of FIG. 4 is the PC 32 will be described below with reference to FIG. 6.

In step S301, the data transmission apparatus 10 accesses the mail server 51 on a regular basis.

In step S302, it is determined whether or not an e-mail is stored in the mailbox for the data transmission apparatus 10. Where an e-mail addressed to the data transmission apparatus 10 is stored (YES in step S302), the processing of step S303 is carried out, while where no e-mail addressed to the data transmission apparatus 10 is stored (NO in step S302), the controller 11 returns to the processing of step S301.

In step S303, an e-mail is received from the mail server 51. It is determined via reference to the header and other information in the e-mail whether the received e-mail is an e-mail returned in response to the e-mail 70 sent in step S108 of FIG. 4 or is a regular e-mail that does not comprise such a return e-mail. Where the e-mail is a regular e-mail, the processing of the following steps S304 through S308 is not performed.

Here, a reply e-mail includes the main text of the received e-mail 70 as well as necessary information entered by the user in the conversion process contents designation field 71 and the recipient change field 72.

In other words, the user of the PC 32 can, for example, write specific parameter values or items in the conversion process contents designation field 71 to indicate the conversion process contents. Because the contents that may be written in the conversion process contents designation field 71 are the same as those input in the input boxes 81 of the setting screen shown in FIG. 9, they will not be explained. Where the user of the PC 32 wishes to receive the image data via a device other than the device that received the e-mail 70, he or she may select a receiving method or methods that can be used by the device on which he or she wishes to receive the image data and input the recipient information regarding that device in the recipient change field 72. Because the contents written in the recipient change field 72 are the same as those input in the input boxes 82 of the setting screen shown in FIG. 9, they will not be explained.

Where no changes are to be made to the information already set in the conversion process contents designation field 71 or the recipient change field 72, the PC 32 user returns the received e-mail as is, and where changes are to be made, he or she can return the e-mail after making such changes. Where it is determined that the image data is not needed, the user of the PC 32 need not return the received e-mail.

In step S304, the received e-mail is analyzed. That is, the contents written in the conversion process contents designation field 71 and the recipient change field 72 are extracted from the e-mail, and the contents of the conversion processes and the contents of the recipient change are recognized.

In step S305, conversion of the resolution, color and file format is carried out to the image data as needed, based on the recognized contents of the conversion processes.

In step S306, it is determined as a result of the recognition of the contents of the recipient change in step S304 whether or not the recipient has been changed. Where the recipient has not been changed (YES in step S306), the processing of step S307 is performed, while where the recipient has been changed (NO in step S306), the processing of step S308 is carried out.

In step S307, the image data that has undergone the designated conversion processes is sent to the designated recipient as a file attached to an e-mail.

In step S308, the image data that has undergone the designated conversion processes is sent to the designated recipient via the designated transmission method.

As described above, according to this embodiment, the data transmission apparatus 10 sends an e-mail requesting that the recipient designate the contents of the prescribed conversion processes to be performed to the image data in order to receive image data obtained by reading an original document, and where the domain name in the recipient's e-mail address is the same as that of the sender, designation of the contents of the conversion processes is received via a Web browser, while where the domain names are different, the designation of the contents of the conversion processes may be received via e-mail.

Therefore, the image data may be received regardless of whether the recipient resides inside or outside the intranet 100 to which the data transmission apparatus 10, which is the sender of the image data, is connected, and in the manner desired by the user, i.e., after undergoing conversion as desired by the recipient.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

In the above embodiment, for example, input of the various information using a Web browser (such as designation of the contents of the conversion processes) is carried out using the form function of the HTML file, but the present invention is not limited to this implementation. Such input may be performed using a Java applet that operates on the Web browser, for example.

Furthermore, the data transmission apparatus 10 has Web server functions in the above embodiment, but it is also acceptable if a database server having Web server functions is used separately from the data transmission apparatus 10 in a construction in which the data transmission apparatus 10 and the database server are connected over a network.

In addition, in the above embodiment, the data transmission apparatus 10 has a printer unit 16, but it is not essential for the data transmission apparatus of the present invention to have a printer unit.

Moreover, in the above embodiment, a situation was described in which image data was obtained by a scanner unit 14 through reading of an original document, but the image data to be sent need not comprise image data read by the scanner unit of the data transmission apparatus. For example, it may comprise image data received by the data transmission apparatus from an external device over a network, or image data obtained by a drive through the reading of image data recorded on a recording medium such as a CD-ROM. In sum, the present invention may be effectively applied in general for the transmission of image data regardless of the method by which the image data was obtained.

The various means that perform control or arithmetic processing in the data transmission apparatus, as well as the data transmission method pertaining to the present invention, may be realized via dedicated hardware circuits or by a programmed computer. Where the present invention is implemented via a programmed computer, the program that operates the computer may be provided on a computer-readable recording medium (such as a floppy disk or CD-ROM, for example). In this case, the program recorded on a computer-readable recording medium is normally loaded onto the hard disk and stored thereon. In addition, this program may be provided on its own as an application software program or integrated into the computer's software as a function thereof, for example.

As described above, according to the present invention, the sender of image data requests that the recipient designate the contents of the prescribed conversion processes to be performed to the image data in order to receive the image data, and may receive such designation via a transmission medium specified by the recipient from among multiple different transmission media.

Therefore, the image data may be received regardless of whether the recipient resides inside or outside the intranet to which the data transmission apparatus, which is the sender of the image data, is connected, and in the manner desired by the user, i.e., after undergoing conversion desired by the recipient.

What is claimed is:

1. A data transmission apparatus for transmitting image data over a network, the data transmission apparatus comprising:
    an image reader for obtaining image data by reading an original document;
    a storage device in which the obtained image data is stored;
    a requester to transmit a request to a recipient device to which the image data stored in the storage device is to be sent for a designation of conversion processes to be performed to the image data;
    a first receiver to receive from the recipient device the designation of the conversion processes;
    a second receiver to receive from the recipient device the designation of the conversion processes via a transmission medium different from that used by the first receiver;
    a switch to select one of the first and second receivers to receive the designation of the conversion process from the recipient device based on information associated with a recipient using the recipient device;
    a converter to perform the conversion processes on the image data stored in the storage device based on the conversion processes; and
    a transmitter to transmit the image data that has undergone the conversion processes to the recipient device.

2. A data transmission apparatus according to claim 1, wherein the requester has a mail transmitter to transmit an e-mail to request the designation of the conversion processes.

3. A data transmission apparatus according to claim 2, wherein the first receiver receives the designation of the conversion processes based on an instruction sent from the recipient device via a setting screen that is used to designate the conversion processes and that was referred to by the recipient based on information that was attached to the e-mail and indicates location of data for the setting screen, and
    wherein the second receiver receives the designation the conversion processes via an e-mail that was returned from the recipient in response to the e-mail sent by the mail transmitter.

4. A data transmission apparatus according to claim 3, wherein the switcher switches to the first receiver when a domain name in an e-mail address of the recipient is identical to a domain name in an e-mail address of a sender, and to the second receiver when the domain name in the e-mail address of the recipient is different from the domain name in the e-mail address of the sender.

5. A data transmission apparatus according to claim 1, wherein the conversion processes include at least a resolution conversion process, a color conversion process or a file format conversion process.

6. A data transmission apparatus according to claim 1, further comprising a recipient change receiver to receive an instruction to change the recipient,
    and wherein the transmitter transmits the image data that has undergone the conversion processes to a new recipient when the recipient is changed.

7. A data transmission method for transmitting image data over a network, the data transmission method comprising:
    obtaining image data by reading an original document;
    storing the image data obtained in a storage device;
    requesting, via a transmission to a recipient device to which the image data stored in the storage device is to be sent, that a recipient using the recipient device designate conversion processes to be performed to the image data;

selecting one of a first receiver and a second receiver to be used for receiving a designation of the conversion process from the recipient device based on information associated with a recipient using the recipient device via a switch, wherein the second receiver is configured to receive from the recipient device the designation of the conversion processes via a transmission medium different from that used by the first receiver;

receiving from the recipient device, the designation of the conversion processes via the selected one of the first receiver and second receiver;

performing the conversion processes to the image data stored in the storage device based on the designation of the conversion processes; and sending to the recipient device the image data that has undergone the conversion processes.

8. A computer-readable recording medium embodying a data transmission program that causes a computer to execute a process comprising:

obtaining image data by reading an original document;

storing the image data obtained in a storage device;

requesting via a transmission to a recipient device to which the image data stored in the storage device is to be sent, that a recipient using the recipient device designate conversion processes to be performed to the image data;

selecting one of a first receiver and a second receiver to be used for receiving a designation of the conversion process from the recipient device based on information associated with the recipient via a switch, wherein the second receiver is configured to receive from the recipient device the designation of the conversion processes via a transmission medium different from that used by the first receiver;

receiving from the recipient device, the designation of the conversion processes via the one of the first receiver and second receiver;

performing the conversion processes to the image data to be sent based on the designation of the conversion processes; and sending the image data that has undergone the conversion processes to the recipient device.

9. A computer-readable recording medium according to claim 8, wherein requesting of the designation of the conversion processes is made through transmission of an e-mail.

10. A computer-readable recording medium according to claim 9, wherein the designation of the conversion processes is received via an instruction sent from the recipient device using a setting screen that is used to designate the conversion processes and that was referred to by the recipient based on information that was attached to the e-mail and indicates location of data for the setting screen if the first receiver is selected, and the designation of the conversion processes is received via an e-mail returned in response to the e-mail sent if the second receiver is selected.

11. A computer-readable recording medium according to claim 10, wherein the selecting step comprises selecting the first receiver when a domain name in an e-mail address of the recipient is identical to a domain name in an e-mail address of a sender, and selecting the second receiver when the domain name in the e-mail address of the recipient is different from the domain name in the e-mail address of the sender.

12. A computer-readable recording medium according to claim 8, wherein the process to be executed by the computer further comprises a step of receiving an instruction to change the recipient, and when the recipient is changed, the image data that has undergone the conversion processes is sent to the new recipient.

* * * * *